United States Patent [19]

Pepe et al.

[11] Patent Number: 5,635,010

[45] Date of Patent: Jun. 3, 1997

[54] DRY ADHESIVE JOINING OF LAYERS OF ELECTRONIC DEVICES

[76] Inventors: Angel A. Pepe, 13 Banyan Tree La., Irvine, Calif. 92714; David M. Reinker, 3675 Fairmont Blvd., Yorba Linda, Calif. 92628; Paul Wojtuszewski, 10 Deer La., Colchester, Vt. 05445

[21] Appl. No.: 421,848

[22] Filed: Apr. 14, 1995

[51] Int. Cl.$^6$ .................... H05K 3/36; H05K 3/46
[52] U.S. Cl. .............. 156/264; 156/295; 156/299; 156/309.6; 156/331.1; 29/830
[58] Field of Search .................. 156/150, 151, 156/292, 295, 307.3, 307.5, 307.7, 264, 299, 309.6, 331.1; 29/829, 830

[56] References Cited

U.S. PATENT DOCUMENTS 4,617,160  10/1986  Belanger et al. ............. 156/307.3 X
4,880,486  11/1989  Maeda .................... 156/275.5 X

*Primary Examiner*—Michael W. Ball
*Assistant Examiner*—Francis J. Lorin
*Attorney, Agent, or Firm*—Plante & Strauss

[57] ABSTRACT

There is disclosed an efficient, cost effective production method to bond layers of electronic devices into an integral stack, or for joining electronic devices to other devices or substrates with use of an adhesive material, preferably an appropriate polyimide, to provide, in effect, a two-stage bonding process. In the first stage, the electronic device is coated, preferably at the wafer level, with a liquid solution of the adhesive material, the coated device is heated to remove solvent, forming a dry adhesive coating of sufficient thickness to fill all spaces between metal traces on the electronic device. Coated wafers can be stacked and bonded, or preferably diced to yield individual chips, which are cut and stacked in a suitable fixture, and heat and pressure are applied in a second stage, to cause viscous flow of the adhesive, filling all voids, and to cure the adhesive, creating an integral, adhesively bonded stack. The adhesive selected for use in the process is one which can be dried to a solvent free layer, which has good B stage properties, exhibits viscous flow at temperatures below its curing temperature, and which is substantially free of volatile release during curing to form a substantially void-free adhesive bond having high film strength, high adhesion, chemical resistance and good dielectric properties.

23 Claims, 5 Drawing Sheets

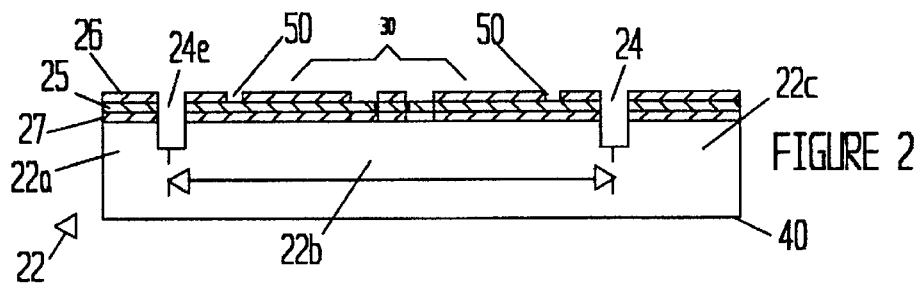
FIGURE 2
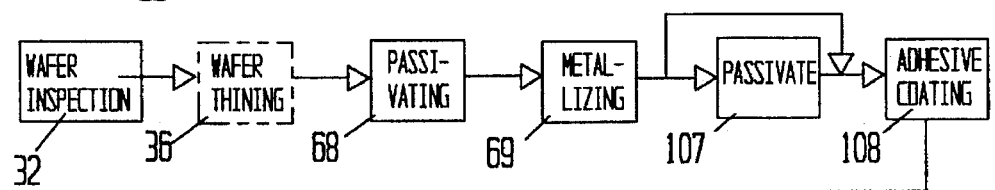
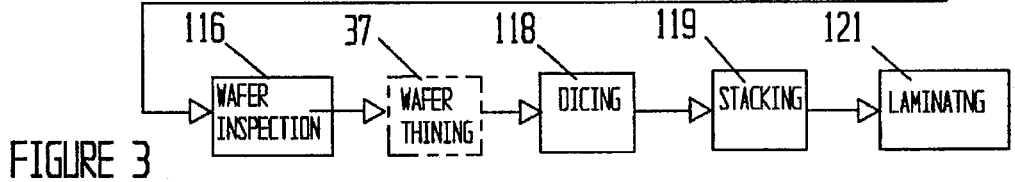
FIGURE 3
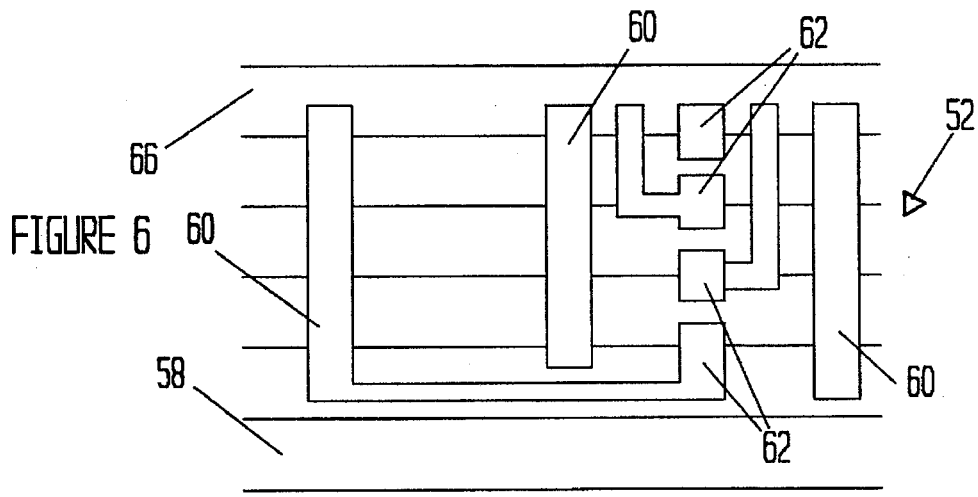
FIGURE 6

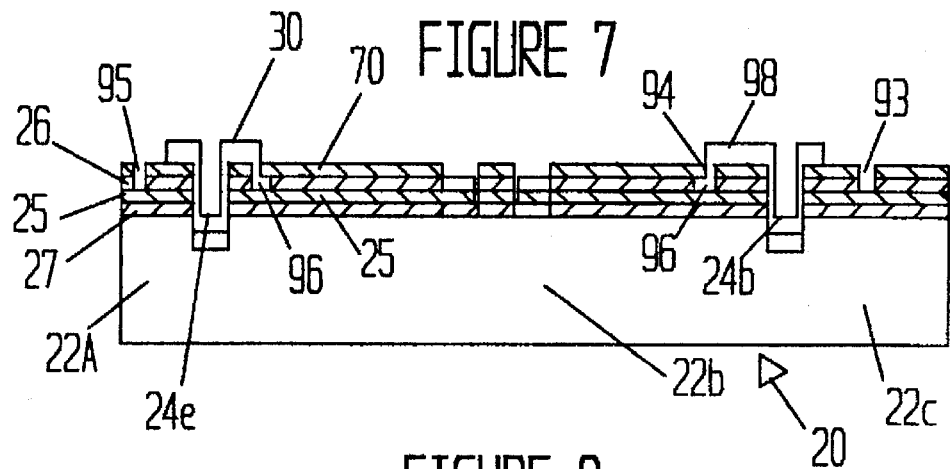
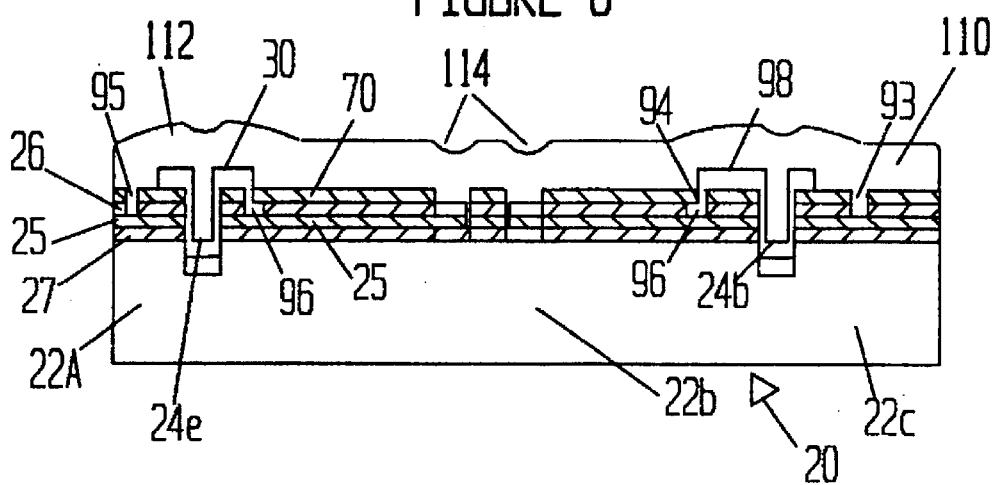
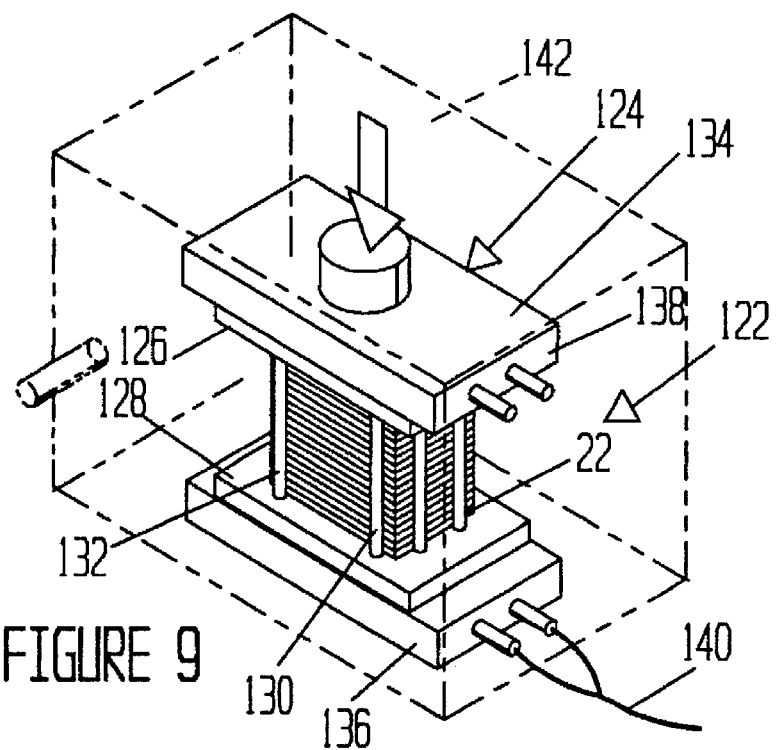

DRY ADHESIVE JOINING OF LAYERS OF ELECTRONIC DEVICES

CROSS REFERENCE TO RELATED PATENTS

The present invention is related to building of stacks of electronic devices such as disclosed in a number of patents of common assignment, e.g., U.S. Pat. Nos. 4,551,629 and 4,672,737 relating to stacking IC chips for use as a focal plane package having a photodetector array at the focal plane, and U.S. Pat. Nos. 4,525,921 and 4,646,128 relating to stacking IC chips for non-focal plane uses, such as computer memory packages.

BACKGROUND OF THE INVENTION

1. Field of the Invention

This invention relates to bonding of electronic devices as particularly applied to the building of stacks of layers of electronic devices, e.g., IC chips, which are stacked and bonded together to provide a high-density electronic package.

2. Brief Statement of the Prior Art

Heretofore, the generally used chip stacking process has been similar to that disclosed in U.S. Pat. No. 4,617,160 which discloses a "wet stacking" process. In this process, a measured amount of adhesive, generally an epoxy adhesive, is applied to each chip as the stack is laminated. After the last chip has been positioned on top of the stack, a force is applied to the stack which forces excess epoxy to extrude from the stack, followed by the application of heat to effect "curing" of the epoxy. The adhesive thickness, after curing, is in the order of 1 to 3 micrometers. While desirable results are obtained with this technique, it is time consuming and labor intensive, and results in a considerable amount of adhesive on the faces of the stack which has to be removed.

SUMMARY OF THE INVENTION

This invention provides an efficient, cost effective production method to bond layers of electronic devices into an integral stack, or for joining electronic devices to other devices or substrates.

The present invention involves use of an adhesive material, preferably an appropriate polyimide, to provide, in effect, a two-stage bonding process. In the first stage, the electronic device is coated, preferably at the wafer level, with a liquid solution of the adhesive material, the coated device is heated to remove solvent, forming a dry adhesive coating of sufficient thickness to fill all spaces between metal traces on the electronic device. Coated wafers can be stacked and bonded, or preferably diced to yield individual chips, which are cut and stacked in a suitable fixture, and heat and pressure are applied in a second stage, to cause viscous flow of the adhesive, filling all voids, and to cure the adhesive, creating an integral, adhesively bonded stack. The adhesive selected for use in the process is one which can be dried to a solvent free layer, which has good B stage properties, exhibits viscous flow at temperatures below its curing temperature, and which is substantially free of volatile release during curing to form a substantially void-free adhesive bond having high film strength, high adhesion, chemical resistance and good dielectric properties.

BRIEF DESCRIPTION OF THE DRAWINGS

FIG. 2 is a cross-section view of a discrete device diced off a wafer such as that shown in FIG. 1;

FIG. 3 illustrates the steps of the dry stacking method of this invention;

FIG. 6 is an enlarged view of the area within line 6-6' of FIG. 5;

FIG. 7 is a cross-sectional view of a wafer in which the wafer surface 2 has been modified by layers of passivation and formation of metal leads and terminals;

FIG. 8 is a view similar to FIG. 7, except that a coating of adhesive material has been applied to the front surface of the wafer and dried;

FIG. 9 illustrates a lamination fixture within a vacuum chamber;

DETAILED DESCRIPTION OF SPECIFIC EMBODIMENTS

Figure 1:
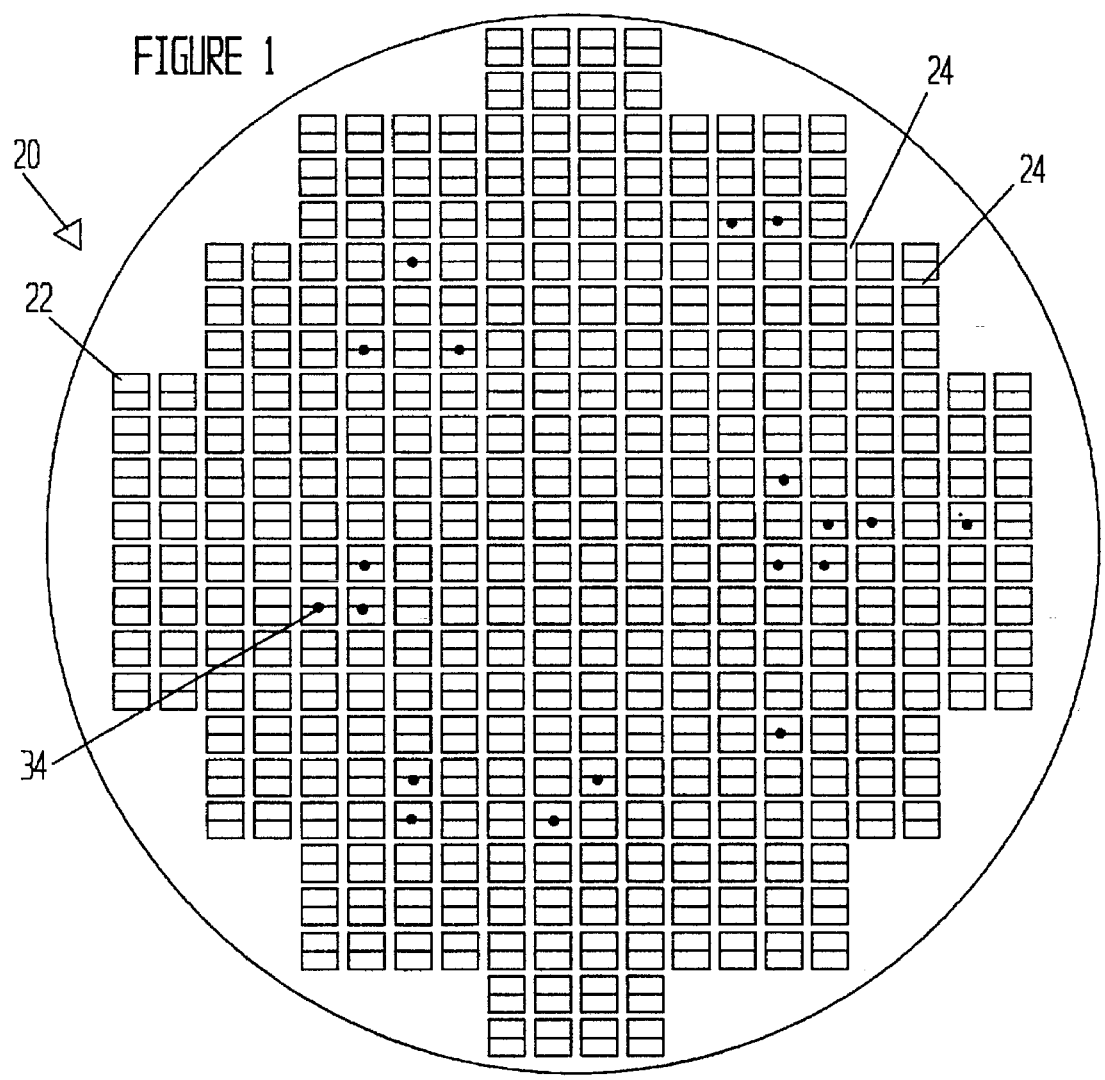
FIG. 1 is a view of a device wafer showing metal traces on one side.

FIG. 1 is a plan view of a silicon wafer 20 as supplied by a vendor. The wafer has a large number of dice (chips) 22, separated from one another by orthogonal streets 24. Wafers are typically 4", 5", 6" or 8" in diameter and contain tens to hundreds of chips, which will be separated by dicing, i.e., sawing along the streets. Each chip contains integrated circuitry (IC) capable of performing electronic functions. The material in wafer 20 is silicon, although other IC chip materials may be used e.g., gallium arsenide. An example of a useful wafer is one which has approximately a five inch diameter, and is approximately 0.024 inch thick. While various semiconductor materials can be used for the wafer, silicon is preferred for preparing stacked modules of chips because of its relatively high heat dissipation efficiency. For example, silicon is 2 to 3 times more thermally conductive than gallium arsenide. A trade off for the advantages of silicon is the need for electrical insulation of the silicon because it is a semiconductor material having relatively high intrinsic electrical conductivity. Gallium arsenide, also a semiconductor material, has intrinsic electrical conductivity 3 or 4 orders of magnitude lower than that of silicon, and therefore is, in relative terms, an electrically semi-insulating material.

FIG. 2 shows a cross-section through a small portion of wafer 20. The silicon body of the wafer is indicated by numeral 40. Streets 24e and 24f provide the cutting lines along which three dice (22a, 22b and 22c) are to be separated. A device area on the upper surface of die 22b is indicated by a bracket having the numeral 30. The arrows between the dashed lines shown the width of the center die 22b. Aluminum metallization indicated at 25 provides conductors connecting the device area 30 to terminals. As supplied by the vendor, the surface of the wafer is covered by a layer of passivation (insulating material) 26, except in those locations 28 where metal terminals (usually aluminum) are formed. Another layer 27 of passivation isolates the metallization layer 25 from the silicon body 40. The passivation layers 26 and 27 may be formed of silicon oxynitride and may be approximately 1 micron thick. The aluminum terminals (or pads) may also be about 1 micron thick. The silicon material forming chips 22 may be from 0.020 in to 0.030 inch thick.

Referring now to FIG. 3, the steps of the dry stacking method of the invention are shown. In the first step 32, the dice are tested in the wafer stage using conventional procedures to detect flawed dice, which are shown on FIG. 1 with a black dot 34. In practice, it is preferred to identify flawed dice with a wafer map, rather than marking of the wafer.

Where the dice or chips, are to be used as layers in a stacked structure, it is desirable that the dice have minimal thickness for efficient stacking and maximum electronic density in the finished stack. This step is identified in FIG. 3 by block 36, which is shown in phantom lines at two locations, depending on the extent of the thinning operation.

The thinning of the dice is performed on the wafer, by removing material from its back surface. This step is performed on the wafer as thinning of the tiny, individual chips would be extremely difficult. The thickness of the wafer will be reduced, from the thickness as supplied by the vendor (about 0.024 inch). In one technique using wax mounting, the wafer can be thinned to as thin as 0.004 inch.

The wafer is wax mounted face down on a rigid disc whose thickness has been measured to an accuracy of 0.001 mils and shown to be flat to within 0.05 mils. The thickness of the disc is fed into a computer and a calculation is made to give a final thickness of the wafer/disc sandwich which will keep the wafer thickness within a 0.0001 inch range. The wafer is then ground to a calculated thickness. After grinding, the wafer can be further thinned, by etching to its final thickness. The etching serves two purposes: fine-tuning of the final thickness, and removal of strain induced in the material by the grinding. After demounting and cleaning, the wafer thickness is measured to within 0.001 mil. The thickness data is then fed into a computer stacking program for later use.

In an alternative technique, which is somewhat more cost efficient for manufacturing, the wafer is mounted on conventional, pressure sensitive dicing tape and is ground to a thickness of about 0.010 to 0.015 inch. Preferably this thinning step is performed just prior to the dicing step, as shown by the phantom box 37 in FIG. 3, thereby permitting processing of the wafer in unreduced thickness and strength through the passivating, metallizing, and adhesive coating steps.

Figure 4:
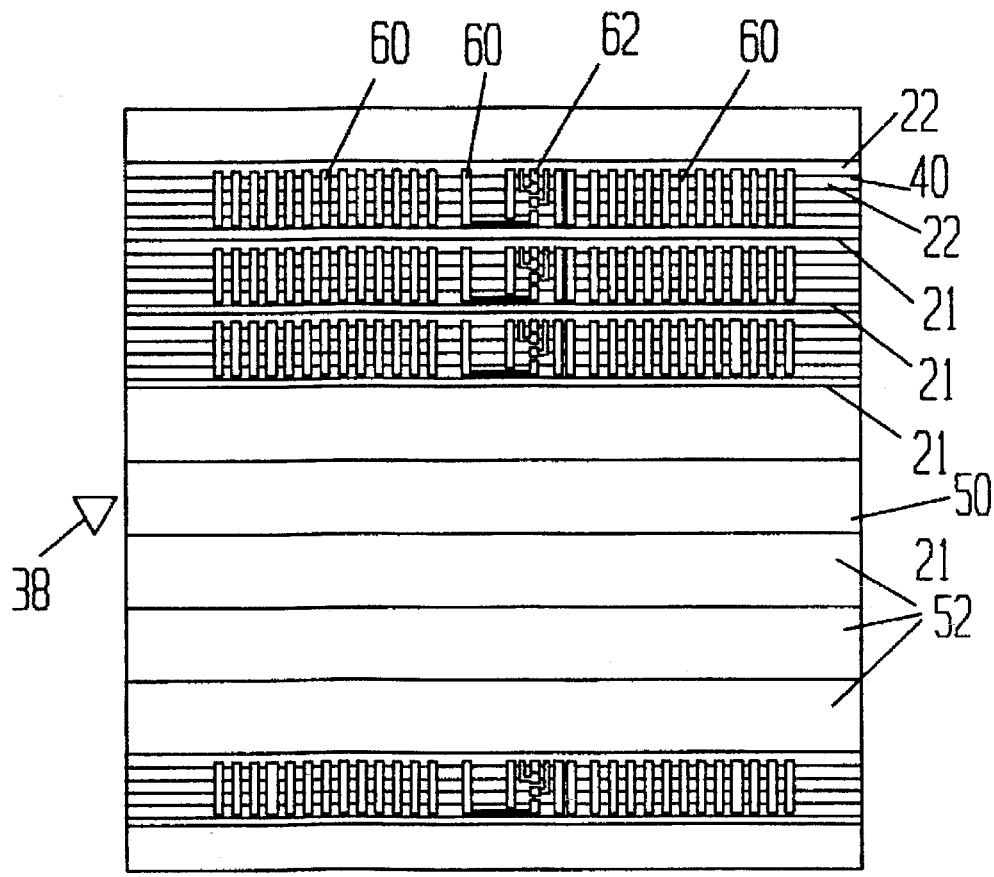
FIG. 4 is a front view of the access plane of a large stack of layers, containing a plurality of small stacks, each of which includes a cap layer and a plurality of IC chip layers.
Figure 5:
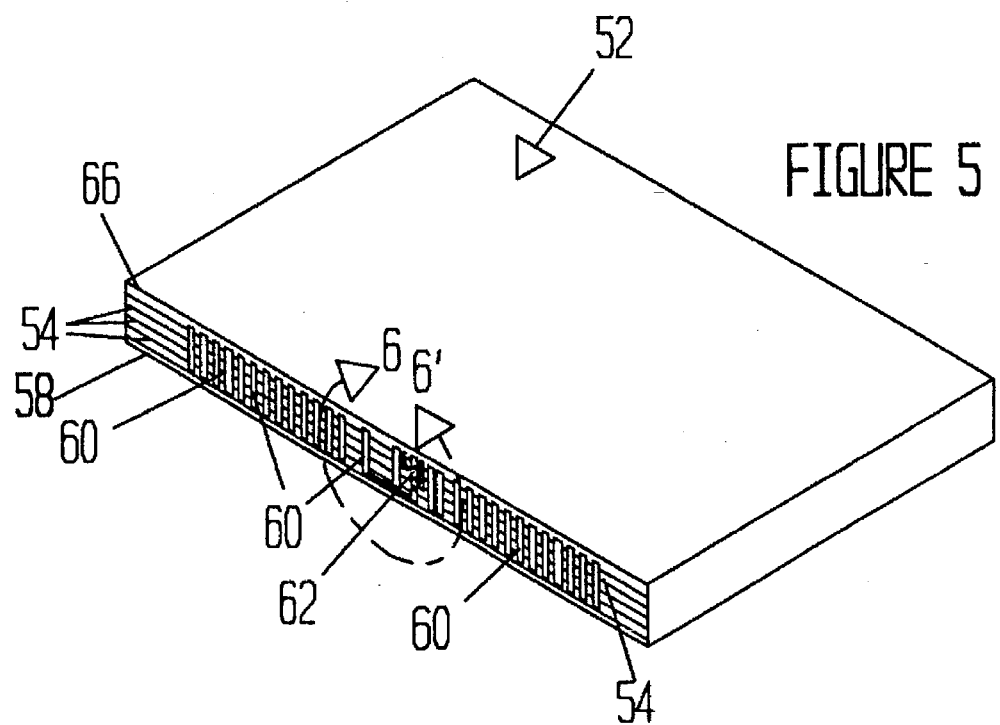
FIG. 5 is an isometric view of an optional short stack, which has been separated from the large stack shown in FIG. 4.

Before providing a further description of the wafer level processing, it will be useful to show the final result after individual dice have been cut from the wafer and laminated into a stacked array. FIGS. 4 and 5 correspond, respectively, with FIGS. 1 and 2 of common assignee U.S. application Ser. No. 07/884,660, filed May 15, 1992. Both of the figures show chips in "pancake" stack 38, which is a one of two basic arrangements, the other being referred to as a "sliced bread" stack. The present invention is equally applicable to both types of stacks (pancake and sliced bread), and to both those stacks which have very thin material layers 40 located between adjacent chips 22, and those stacks which have thicker material layers between adjacent chips.

FIG. 4 is a front view of the access plane 50 of a large stack 38 containing numerous stacks of chip layers. The processes needed to provide insulation and metallization on the access plane 50 are performed on the large stack 38. Then the large stack 38 is segmented along adhesive layers 21 to form a plurality of short stacks 52, one of which is shown isometrically in FIG. 5. Each short stack 52 contains a predetermined number of active layers 54 (i.e., layers having internal integrated circuitry).

As shown in both FIGS. 4–6, electrically conductive metallization has been formed on the access plane 50, which metallization is electrically connected to leads from the integrated circuitry in the active chips; but both the leads and the metallization are insulated from the silicon semiconductor material of the chips. The access plane metallization seen in FIGS. 4 and 5 includes both numerous vertically extending buses 60 which reach all the active chips in the short stack 52, and also individual terminal pads 62 which permit separate access to each active layer 54. The upper layer 66 is a passivation component and the lower layer 58 is inactive.

The buses 60 and pads 62 are shown in greater detail in FIG. 6, which is an enlarged view of the area 6—6' of FIG. 5. T-connect metallization strips extend onto the lower portion of the top (inactive) layer 66 in the form of numerous vertically extending buses 60, and pads 62 permitting separate access to each chip. These buses 60 and pads 62 are electrically connected to the circuitry embedded in the stacks, by means of a multiplicity of T-connects of the type disclosed in prior common assignee patents and applications. The term "T-connect" means that each flat lead coming from the IC portion of the layer to the layer edge is in electrical contact with a metal strip 60 or pad 62 which extends beyond the lead in both directions (both upwardly and downwardly in FIGS. 4–6). The T-connects are useful, where the more common techniques of solder bonding are not feasible.

It is preferred to conduct the passivation and metallization of the wafer 20 before separation of the individual dice 22. This is shown as blocks 68 and 69 of FIG. 3. A cross section of a portion of a passivated and metallized wafer 20 is shown in FIG. 7. A detailed description of the wafer appears in common assignee U.S. Pat No. 5,104,820. In this step, layers of passivation are applied over the vendor-supplied wafer, then a metallization procedure is practiced to bring the leads of the separate chips to a single edge of each chip, and finally another layer of passivation is applied over the leads.

FIG. 7 shows the cross-section of the modified wafer 20, ready for an adhesive coating. As shown in FIG. 7, a layer 70 of insulation (polyimide or SiON) has been deposited over the entire upper (device) surface on the wafer 20. It is preferred to use polyimide materials for the insulating layer, as these materials have a relatively low dielectric constant, and lend themselves to formation of thick layers. The preferred polyimide used for layer 70 is DuPont 5878, because it has good dielectric properties and high temperature resistance.

In forming the polyimide layer 70, polyimide material in liquid form is spun on, sprayed on, or otherwise caused to cover the surface of the wafer. The polyimides used in the dielectric layers are self-adhesive", i.e., they will adhere to whatever surface they are cast on. However, they don't have adhesion capability to hold two different surfaces together. They are condensation polymers having a very low initial solid content. After the layer has been applied in liquid form, it is heated to remove solvent, which constitutes about 74 weight percent of the applied liquid and cured. The dielectric polyimide is unsuitable for use as an adhesive as its curing is a condensation reaction which gives off water which would form voids in an adhesive layer. It is suitable for passivation, however, as the water vapor can be permitted to escape.

The insulating film 70 can also be formed by plasma-enhanced chemical vapor deposition (PECVD) at 374° C. in gas mixtures of silane, nitrous oxide, nitrogen, and argon. The exact mixture is dependent upon which of the films is being deposited. The plasma-enhanced chemical vapor deposition (PECVD) is used instead of chemical vapor deposition (CVD) because PECVD is performed at 374° C., whereas CVD is performed above 700° C. Since silicon readily dissolves in aluminum, moving rapidly along aluminum grain boundaries at temperatures above 450° C., and precipitates out of solution some distance from the dissolution site, and since the eutectic temperature of aluminum-silicon is 577° C., the CVD temperature could be destructive to silicon devices.

The thickness of the insulation film 70 must be carefully chosen. The film 70 should be thick enough to avoid excessive capacitance and prevent cross-talk between the aluminum conductors 25 below the film and the metal conductors 98 above the film 70. However, excessive thickness of the film 70 may cause stress on the metallic conductors.

The first layer 70 of passivation film initially covers the surface of the wafer 20. Vias 94 are formed in the layer 70 to expose the terminals on the wafer to metal conductors which run a trace out to the edge of each die, and the wafer is diced along streets 24.

In an alternative processing new streets 93 and 95, and vias 94 are subsequently formed in the layer 70. The vias expose the terminals on the silicon wafer 20 and metal terminals 96 are formed in the vias 94 and electrical leads 98 are formed between the vias 94 and the edges of the dice 22 to provide electrical connections from each terminal 96 to the edges of the dice 22 which form the access plane 50 shown in FIGS. 4 and 5. These subsequent processing steps are described in the following paragraphs.

After formation of the passivating layer 70, the wafer 20 is selectively etched to form vias 94 through the layer 70. In the alternative processing, new streets 93 and 95 are formed in the adjacent dice 22a and 22c, respectively. The layer 70 is removed from the openings 94, into which metal will be deposited to provide conductor terminals. The etching is performed with a photo-lithographic process using a mask to expose selected areas of a photoresist coating and thus permit etching only where desired.

Then the wafer 20 is placed in a buffered oxide etch (BOE), in which the unprotected areas of the passivation layer 70 are removed. Silicon is not etched by the BOE. The etching time to remove passivation is carefully controlled to avoid undercutting. The undeveloped photoresist limits etching of the passivation to the desired locations, and is removed with a solvent after the etching is completed. At this point, the wafer has terminal openings 94 and, in the alternative processing, new streets 93 and 95. The remainder of the front wafer surface is covered by a layer 70 of passivation at least 1.0 micron thick.

The wafer 20 is then metallized to provide the electrical leads 98 which connect the interior integrated circuitry to the exterior electrical terminals and buses. In the preferred method, disclosed in U.S. Pat. No. 5,104,820, a thin layer of an adhesive field metal, preferably a titanium-tungsten alloy, is applied followed by a coating of a highly electrical conducting metal. Suitable metals include copper, nickel, gold or aluminum-copper alloys. Gold and aluminum-copper alloys are preferred conducting metals.

The layers are applied by a sputtering technique or by evaporation, and, with the exception of aluminum or its alloys, the conducting leads 98 and terminals 96 are thereafter built up to a thickness of about 2.5 microns by a metal plating step using a masked photoresist to define the leads and terminal locations. The undeveloped photoresist is removed with a solvent, and the field metal layers are then removed by etching. Alternatively, and for aluminum and its alloys, the leads and terminals can be built up with a lift off technique, in which a masked photoresist is applied to the adhesive metal layer, followed by a layer (film) of the conducting metal and treatment with a solvent for the photoresist, which swells the photoresist and permits removal of excess metal with a pressure sensitive tape.

The next step 108 (see FIG. 3) of the process is the application of the adhesive coating. As shown in FIG. 8, a layer 110 of adhesive material has been applied on the front wafer surface, covering the surface with an adhesive coating. The coating as applied may have non-planar irregularities 112 which are located over the raised surfaces of the metallic leads 98, and depressions 114.

Useful adhesives for this application are those which can be formed as a dry, solvent-free, preferably non-tacky, coating on the wafer, and which will initially flow under the heat and pressure applied to the stack of chips in the lamination fixture and thus filling in any non-planar recesses in the chip and permitting extrusion of the adhesive to a layer of minimal thickness. The material must also form an adhesive bond between adjacent chips of high integrity, i.e., free of voids under the heat and pressure applied in the lamination fixture. Desirably, the adhesive will exhibit viscous flow under the applied pressure at temperatures which are below its curing temperature, e.g., at temperatures from about 200° C. to 300° C., and which will cure to a solid adhesive layer at more elevated temperatures, e.g, from about 300° C. to 400° C.

It is preferred to use thermosetting resins to obtain a permanent bonding, however, in instances where temporary bonding is desired, thermoplastic resins can be used. An instance for the use of a thermoplastic resins is in bonding of stacks which are to be segmented to obtain short stacks, the thermoplastic bonds providing the separation planes for segmenting the stack.

The preferred resins are low molecular weight polyimides, i.e., oligomers. Preferably, mixed molecular weight oligomers having a degree of polymerization from 3 to about 7, preferably from 4 to 5, are used, rather than a mono-molecular weight oligomer. The most preferred polyimide is one which has a polydispersity (ratio of weight average to number average molecular weights) from 2 to 4, preferably about 3.2. The polyimide should be fully imidized, i.e., not contain any acid groups, poly(amic-acid), which will evolve water vapor upon curing, as any gas or water evolution will from voids in the adhesive layer which will create problems when forming the T-connects on the access plane of a chip stack.

It is also preferred to control the curing temperature of the oligomer by judicious selection of end (cap) groups. Most preferred are phenyl ethnyl aniline end groups ($C_7H_5$), which impart a cure temperature to the oligomeric polyimide of about 300° C., thus providing opportunity for viscous flow of the adhesive layer prior to its curing. In contrast, polyimides with acetylene end groups (CH) will cure at temperatures of about 220° C., a temperature which limits the viscous flow of the adhesive.

A useful test to check the suitability of a material is to coat a chip and dry the coating in the normal manner, and then laminate the chip to a glass slide. After curing, the laminate is inspected under a microscope to determine if any voids have formed in the adhesive layer. Another test is to bond two chips together and test the integrity of the adhesive layer with ultrasonic vibration, the presence of voids being observed by variations in reflectance or transmission of the ultrasonic vibrations.

A suitable polyimide material which has been used successfully is Thermid 5405, available from National Starch, which is a solution of a thermosetting, fully imidized mixture of oligomeric iso-imides in a solvent mixture of 70% gama-butyrolactone and 30% cyclopentanone.

Various other adhesive systems can be used for this application, provided they have insulating properties comparable to the polyimide adhesives and exhibit viscous flow at initial temperature and pressure conditions and form a thin layer adhesive bond at more severe, final conditions of the lamination procedure.

Examples of other adhesives include catalyst-activated or coreactant adhesives in which the catalyst or coreactant is supplied as a temperature sensitive adduct or complex, such as epoxy prepolymers admixed with a adduct of an amine coreactant complexed with a temperature sensitive Lewis acid carrier, or encapsulated within a pressure sensitive carrier such as microspheres. Other thermosetting adhesive resins are polyquinolin, or benzocyclobutene which can be used in a suitable solvent such as mestiylene.

The preferred, thermosetting polyimide adhesives can be applied as a liquid, dissolved in a suitably volatile solvent or by solvent free vacuum deposition. When applied as a liquid, techniques such as spinning, squeezing, spraying, painting, dipping, or meniscus coating can be used. The preferred application technique is spinning.

After the adhesive-containing liquid is applied, the solvent is removed by evaporation, preferably in several stages; initially drying at 110° C. to 130° C., followed by drying under vacuum at 174° to 240° C. The solvent selected must be completely removed in the drying steps at temperatures which are sufficiently low that the layer of adhesive is not prematurely set or cured which would impair its ability to flow under the initial application of heat and pressure in the lamination fixture. Suitable solvents which can be used for the preferred polyimide adhesive are: gama-butyrolactone or N-methylpyrrolidone, which can be thinned with cyclopentanone.

The adhesive material is applied in sufficient quantities to form an adhesive coating with a thickness from 2 to about 30 microns, preferably from 2 to about 8 microns. Under the heat and pressure applied in the lamination fixture, the thickness of this coating is reduced to a value from one monolayer to about 2 microns, with any excess adhesive material being extruded from the chip stack.

Similar solution application techniques can also be used for the thermoplastic polyimide adhesives. In addition, the thermoplastic adhesives can be applied as a preformed solid film to the wafer, or can be applied between the individual chips as they are stacked in the lamination fixture.

The polyimide material should have a softening and viscous flow temperature below the final lamination conditions of temperature and pressure. The preferred polyimide exhibits sufficient viscous flow at the initial temperature and pressure conditions such that it fills all voids between adjacent chips and excess adhesive extrudes from the chip stack to achieve minimal thickness of the adhesive layer. Preferably, the adhesive activation temperature, or cure temperature, of the polyimide is from about 300° C. to 400° C., sufficiently high to provide initial conditions in the lamination fixture where the material is in a viscous flow condition.

The wafers 20 are tested for electrical continuity and integrity, represented by block 116 of FIG. 3, and after wafer testing, the modified dice (chips) are cut out of the wafer (step 118 of FIG. 3), cutting along the lines provided by the new orthogonal streets 93 and 95.

Referring now to FIG. 9, the individual chips are stacked into a non-integral stack (identified in FIG. 3 by block 119), preparatory to the lamination step. The stack of chips 22 is shown in a lamination fixture 124 comprising an upper plate 126 and a lower plate 128 which are assembled on alignment pins 130 and 132 at each end and side of the stack 122 of chips. A detailed description of suitable lamination equipment appears in the previously mentioned U.S. Pat. No. 4,617,160, and the illustrations of lamination equipment in this application is provided only to illustrate the conditions of lamination.

As shown in FIG. 9, the fixture 124 is positioned between the platens 134 and 136 of a press to perform the lamination step (identified in FIG. 3 by block 121. The press compress the plates together and exerts a compressive force from about 5 to 750 pounds per square inch (psi) on the stack. The platens 134 and 136 contain suitable heating elements 138 such as electrical resistance heaters supplied with electrical power by leads 140. The stack 122 of chips is heated, at the rate of about 2° C. to 20° C. per minute to provide sufficient time of the adhesive to reach a viscous flow condition and fill all non-planar irregularities 112 and 114 (FIG. 8) in the interface surface between adjacent chips before curing of the adhesive.

The pressure can be applied during the entire heating period, or can be applied at any time after the stack has been heated to the viscous flow state of the adhesive layer. In some applications, it is desirable to apply the pressure in two or more increments, with the initial pressure being sufficient to maintain the integrity of the stack, and the final pressure being sufficient to exert the necessary extrusion force on the adhesive layer.

Excess adhesive is extruded from between the chips to reach the optimum minimal adhesive layer thickness. The stack 122 is maintained under pressure and temperature for sufficient time to cure the adhesive layer and then is cooled. When the stack has been cooled to below the glass transition temperature for the adhesive, the pressure can be released. Although not always necessary, it is preferred to perform the compression and heating of the stack within a vacuum chamber 142 (shown in phantom lines) to insure that voids are not formed in the adhesive layers during the lamination.

Figure 10:
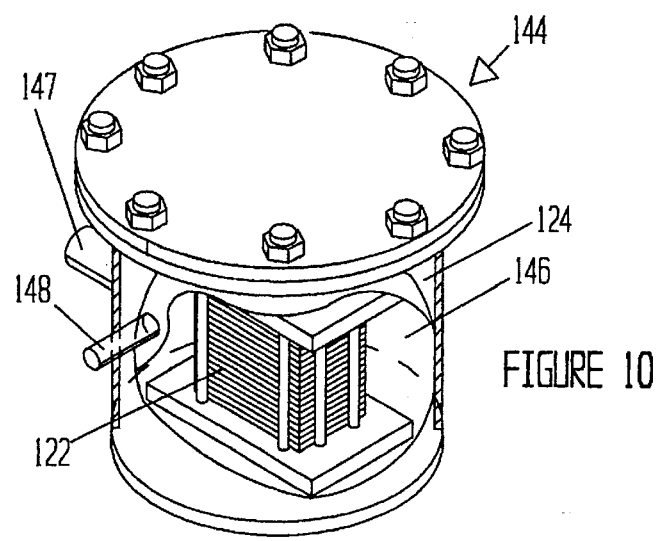
FIG. 10 illustrates the lamination fixture within an autoclave.

FIG. 10 illustrates an alternative lamination in an autoclave 144, which is shown in partial cross-section. In this lamination, the fixture 124 is placed within a sealed, flexible bag 146, formed of a suitable material, e.g., natural or synthetic rubber, which has a neck 148 to attach a hose or conduit leading to a vacuum source, e.g., a vacuum pump. The bag 146 is filled with a non-integral stack of chips 122 in a lamination fixture 124, and is placed within autoclave 144 which can have an internal heater such as an electrical resistance heating element. The autoclave 144 is closed and sealed and the bag neck 148 is connected to a vacuum source through a hose or conduit. The autoclave 144 is pressured through nozzle 147 with a suitably inert gas such as nitrogen and its contents are slowly heated under the conditions described with regard to FIG. 10, while applying a vacuum to bag 146 to prevent formation of any voids.

Figure 11:
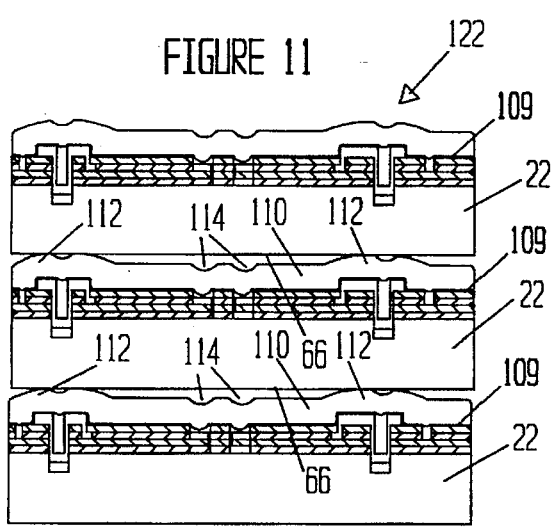
FIG. 11 shows a section through a plurality of stacked chips before lamination.
Figure 12:
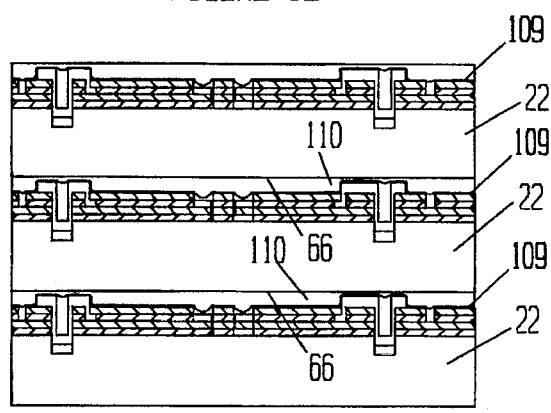
FIG. 12 shows a section through a plurality of stacked chips after lamination and bonding.

FIG. 11 illustrates a partial sectional view of several stacked chips 22 of the non-integral stack 122 before the lamination step. As there illustrated, the adhesive layers 110 have been applied over a passivating layer 109 of a polyimide. The adhesive layers 110 are relatively thick and their surfaces are not entirely planar and thus do not conform precisely to the undersurfaces 66 of the juxtapositioned chips. After the application of heat and pressure in the lamination step, however, the irregularities 112 an depressions 114 are eliminated, as illustrated in FIG. 12, which shows the stacked chips 22 after the adhesive material has experienced viscous flow, filling any non-planar irregularities in its surface. Additionally, the heat and pressure have extruded excess adhesive material from between adjacent chips to form final adhesive layers 110 of minimal, e.g., 0.5 to 2.0 microns, thickness.

The integral stack of chips adhesively bonded together is thereafter processed to provide a finished product such as shown in FIGS. 4–6 which have electrical connects one an access face. A detailed description of one suitable method appears in the aforementioned U.S. Pat. Nos. 4,464,128, 4,672,737 and 5,104,820.

In one suitable method, each access plane 50 is etched to remove semiconductor material and expose metal leads, then covered with a layer of passivation material, preferably with a polyimide to insulate the metallic conductors from the silicon body 40 of the stack. After application and curing of the polyimide, the metal leads are exposed by lapping and polishing. Thereafter a metallization procedure is applied to the access plane 50 using appropriate photo-delineation followed by etching to deposit the desired pattern of electrical buses 60 and terminals 62 on the access plane 50, such as those shown in FIGS. 4–6. Alternatively, the lift off technique, previously described can be used to deposit the buses and terminals.

In an alternative method, each access plane 50 is coated with a passivation material, preferably a polyimide, and the polyimide layer is etched to form vias through the layer and access the metal conductors beneath the layer.

The thermosetting polyimide adhesive has adequate thermal stability to permit application and curing of a polyimide passivating layer on the access plane of the stack. This is an important benefit, as the highly desirable passivating polyimide resins have high curing temperatures, e.g., from 250° C. to 400° C.

The advantages provided by the thermoplastic polyimide adhesive are apparent from FIGS. 4 and 5. As previously mentioned, the preparation of a short stack 54, shown in FIG. 5 is accomplished by segmenting the stack 54 from the cube 38 of FIG. 4, along the adhesive bond, shown as 21 in FIG. 4. Preferably, a thermoplastic polyimide is used for this adhesive bond 21, thereby permitting facile segmentation by heating the cube 38 to the softening temperature of the adhesive layer 21.

It is also apparent from the preceding description, that the invention provides significant improvements in the manufacture of chips stacks by increasing the efficiency and lowering costs of the manufacture. Because the adhesive material is applied to the semiconductor device wafer before the individual chips (or dies) are cut from the wafer, the laborious application of adhesive to each chip is eliminated.

The invention has been described with reference to the illustrated and presently preferred embodiment. It is not intended that the invention be unduly limited by this disclosure of the preferred embodiment. Instead, it is intended that the invention be defined by the means, and their obvious equivalents, set forth in the following claims.

What is claimed is:

1. In a method for fabrication of a high-density electronic package wherein a plurality of electronic device layers, which in raw form comprise a plurality of electronic devices arrayed on an electronic device wafer, are separated as individual devices from the wafer, stacked and adhesively bonded together into a layered stack by a lamination step including the application of heat and compression to the stack, the improvement comprising:

a. applying an adhesive material to at least one surface of said wafer to obtain a wafer having a substantially dry, solvent-free coating of adhesive material thereon;

b. separating said wafer having said coating of adhesive material into a plurality of discrete, individual electronic devices of substantially equal size;

c. stacking said plurality of electronic devices to form a non-integral stack of layers of electronic devices said coating of adhesive material at the interface between adjacent layers of electronic devices;

d. applying heat and compressive loading to said non-integral stack in a progressive manner to provide viscous flow conditions of heat and pressure sufficient to soften said coatings of adhesive material and cause said coatings to undergo viscous flow sufficient to fill any non-planar irregularities at the interfaces between adjacent electronic device layers and to extrude from between said adjacent layers, thereby reducing the thicknesses of said adhesive layers and adhesive curing conditions sufficient to cure said adhesive layers into adhesive bonds between said adjacent layers; and e. cooling said stack and releasing said compressive pressure to obtain said high-density electronic package of a plurality of integral, electronic device layers.

2. The method for fabrication of claim 1 wherein said adhesive material is a fully imidized oligomeric, isoimide.

3. The method for fabrication of claim 2 wherein said imide is a thermosetting polyimide.

4. The method for fabrication of claim 3 wherein said adhesive curing conditions include heating to an adhesive curing temperature from 300° C. to 400° C.

5. The method for fabrication of claim 4 wherein said polyimide is applied to said wafer as a solution in a volatile solvent to obtain a liquid-adhesive-coated wafer.

6. The method for fabrication of claim 5 including the step of removing said volatile solvent by drying said liquid-adhesive-coated wafer to obtain a wafer having a dry, solvent-free adhesive coating.

7. The method of claim 6 wherein said solvent is removed by vaporization under sufficiently reduced pressure to permit complete removal of said solvent at evaporation temperatures less than the adhesive curing temperature of said adhesive material.

8. The method for fabrication of claim 7 wherein said reduced pressure is subatmospheric pressure.

9. The method for fabrication of claim 1 including the step of reducing the thickness of said wafer prior to the application of said adhesive material.

10. The method for fabrication of claim 1 wherein said stack is cooled to below the glass transition temperature of said adhesive material prior to releasing said compressive pressure.

11. The method for fabrication of claim 1 including the steps of applying layers of metal leads to connect terminals at preselected locations on the front surface of said wafer prior to the application of said adhesive material.

12. The method for fabrication of a high density electronic package comprising a stack of a plurality of electronic device layers laminated together with adhesive bonds which comprises:

a. the step of coating semiconductor wafers of electronic chips that have surfaces with non-planar irregularities with an adhesive material having the properties of forming a dry, solvent-free, non-tacky coating which when heated exhibits viscous flow at an intermediate temperature and cures into an adhesive bond at a more elevated curing temperature without releasing volatiles during curing;

b. separating from said coating step wafers having substantially dry, solvent-free coatings of adhesive material thereon;

c. subsequently treating said adhesive coated wafers by the steps of dicing and forming stacks of layers of said electronic devices with said adhesive coatings at the interfaces between adjacent layers of said electronic devices, and heating under compression said stacks in a progressive manner comprising an initial step at said intermediate temperature and sufficient pressure to cause said adhesive coatings to undergo viscous flow and fill said non-planar irregularities of said surfaces and to extrude from between said adjacent layers, and a final adhesive coating curing step at said more elevated temperature sufficient to cure said adhesive coatings to bonds cementing said layers into coherent stacks; and d. cooling said stacks and releasing said compressive pressure to obtain high-density electronic packages, each comprising a plurality of integral, electronic device layers.

13. The method for fabrication of claim 12 wherein said adhesive material is a fully imidized oligomeric, iso-imide.

14. The method for fabrication of claim 13 wherein said imide is a thermosetting polyimide.

15. The method for fabrication of claim 14 wherein said more elevated temperature is from 300° C. to 400° C.

16. The method for fabrication of claim 14 wherein said polyimide is applied to said wafer as a solution in a volatile solvent to obtain a liquid-adhesive-coated wafer.

17. The method for fabrication of claim 16 including the step of removing said volatile solvent by drying said liquid-adhesive-coated wafer to obtain a wafer having a dry, solvent-free adhesive coating.

18. The method of claim 17 wherein said solvent is removed by vaporization under sufficiently reduced pressure to permit complete removal of said solvent at evaporation temperatures less than the adhesive curing temperature of said adhesive material.

19. The method for fabrication of claim 18 wherein said reduced pressure is subatmospheric pressure.

20. The method for fabrication of claim 12 including the step of reducing the thickness of said wafer prior to the application of said adhesive material.

21. The method for fabrication of claim 12 wherein said stack is cooled to below the glass transition temperature of said adhesive material prior to releasing said compressive pressure.

22. The method for fabrication of claim 12 including the steps of applying layers of metal leads to connect terminals at preselected locations on the front surface of said wafer prior to the application of said adhesive material.

23. The method for fabrication of claim 12 wherein said step of dicing is performed on said wafers prior to said steps of stacking and heating said electronic devices under compression.

* * * * *